(12) United States Patent
Sheu et al.

(10) Patent No.: US 7,875,844 B2
(45) Date of Patent: Jan. 25, 2011

(54) ABSOLUTE-TYPE ENCODER AND METHOD FOR DETECTING ABSOLUTE POSITION

(75) Inventors: Hong-Cheng Sheu, Taoyuan Hsien (TW); Mang Ou-Yang, Jhongli (TW); Wei-Kai Su, Sindian (TW)

(73) Assignees: Delta Electronics, Inc., Taoyuan (TW); National Central University, Taoyuan (TW)

( * ) Notice: Subject to any disclaimer, the term of this patent is extended or adjusted under 35 U.S.C. 154(b) by 231 days.

(21) Appl. No.: 12/202,656

(22) Filed: Sep. 2, 2008

(65) Prior Publication Data

US 2010/0051792 A1    Mar. 4, 2010

(51) Int. Cl.
G01D 5/34 (2006.01)
(52) U.S. Cl. ............................. 250/231.16; 250/237 G
(58) Field of Classification Search .................................
250/231.13–231.18, 237 G
See application file for complete search history.

(56) References Cited

U.S. PATENT DOCUMENTS

| | | | | |
|---|---|---|---|---|
| 4,263,506 A * | 4/1981 | Epstein | ................. | 250/231.16 |
| 4,736,187 A * | 4/1988 | Kibrick et al. | ................. | 341/3 |
| 4,780,703 A * | 10/1988 | Ishida et al. | ................. | 341/6 |
| 4,786,891 A * | 11/1988 | Ueda et al. | ................. | 341/13 |
| 4,796,005 A * | 1/1989 | Ishida et al. | ................. | 341/11 |
| 4,914,437 A * | 4/1990 | Kibrick et al. | ................. | 341/3 |
| 4,945,231 A * | 7/1990 | Ohya et al. | ................. | 250/231.14 |
| 4,991,125 A * | 2/1991 | Ichikawa | ................. | 250/237 G |
| 5,003,171 A * | 3/1991 | Paley | ................. | 250/231.14 |
| 5,012,238 A * | 4/1991 | Hayashi et al. | ................. | 341/15 |
| 5,128,536 A * | 7/1992 | Higashi | ................. | 250/231.16 |
| 5,235,181 A * | 8/1993 | Durana et al. | ................. | 250/231.18 |
| 5,260,568 A * | 11/1993 | Ieki | ................. | 250/231.18 |
| 5,336,884 A * | 8/1994 | Khoshnevisan et al. | | 250/231.18 |
| 5,418,362 A * | 5/1995 | Lusby et al. | ................. | 250/231.18 |
| 5,506,579 A * | 4/1996 | Spaulding | ................. | 341/11 |
| 5,530,331 A * | 6/1996 | Hanei | ................. | 318/592 |
| 5,841,133 A * | 11/1998 | Omi | ................. | 250/231.13 |
| 5,917,182 A * | 6/1999 | Ishizuka | ................. | 250/237 G |
| 5,965,825 A * | 10/1999 | Nitecki | ................. | 73/861.77 |
| 6,093,928 A * | 7/2000 | Ohtomo et al. | ................. | 250/231.13 |
| 6,366,047 B1 * | 4/2002 | Horwitz et al. | ................. | 318/602 |
| 6,563,443 B2 * | 5/2003 | Oberhauser | ................. | 341/115 |
| 6,820,030 B2 * | 11/2004 | Steinlechner et al. | | 702/151 |
| 7,002,137 B2 * | 2/2006 | Thorburn et al. | ................. | 250/231.13 |
| 7,112,781 B2 * | 9/2006 | Ch'ng et al. | ................. | 250/231.13 |
| 7,158,690 B2 * | 1/2007 | Gupta | ................. | 382/286 |
| 7,391,012 B2 * | 6/2008 | Chiu | ................. | 250/231.18 |

(Continued)

Primary Examiner—John R Lee
(74) Attorney, Agent, or Firm—Chun-Ming Shih; HDLS IPR Services

(57) ABSTRACT

An absolute-type encoder includes an absolute-type encoder wheel. The absolute-type encoder wheel includes a primary optical grating unit and two secondary optical grating units, wherein the two secondary optical grating units are arranged outside and inside the primary optical grating unit and contain one less optical grating than that of the primary optical grating unit. The encoder wheel is rotated to find a zero point in the light detection signal of the secondary optical grating unit, and a corresponding light detection value of the primary optical grating unit is also determined based on the zero point. The absolute position of the encoder wheel can be calculated with reference to the corresponding light detection value. The absolute-type encoder can also be used as an incremental-type encoder to provide more versatility.

9 Claims, 5 Drawing Sheets

U.S. PATENT DOCUMENTS

| | | | |
|---|---|---|---|
| 7,612,327 B2 * | 11/2009 | Okada | 250/231.13 |
| 7,663,093 B2 * | 2/2010 | Kusano | 250/231.18 |
| 2005/0023451 A1 * | 2/2005 | Horton | 250/231.14 |
| 2005/0092903 A1 * | 5/2005 | Muenter | 250/231.13 |
| 2005/0133705 A1 * | 6/2005 | Hare et al. | 250/231.13 |
| 2005/0258986 A1 * | 11/2005 | Hare et al. | 341/50 |
| 2006/0108516 A1 * | 5/2006 | Villaret | 250/231.18 |
| 2010/0051792 A1 * | 3/2010 | Sheu et al. | 250/231.13 |

* cited by examiner

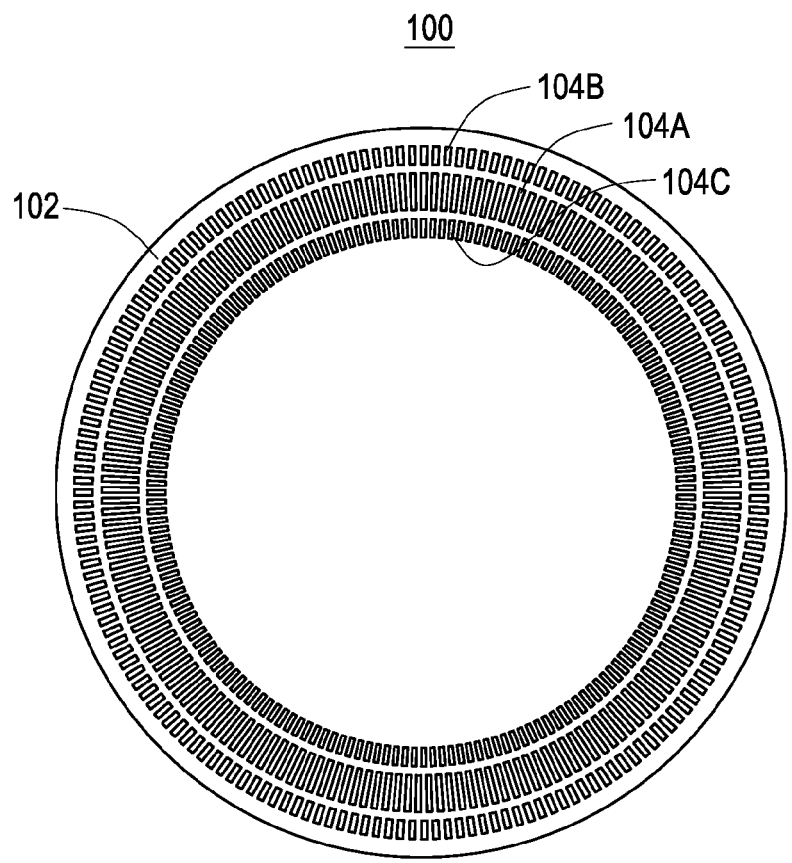
FIG.5A
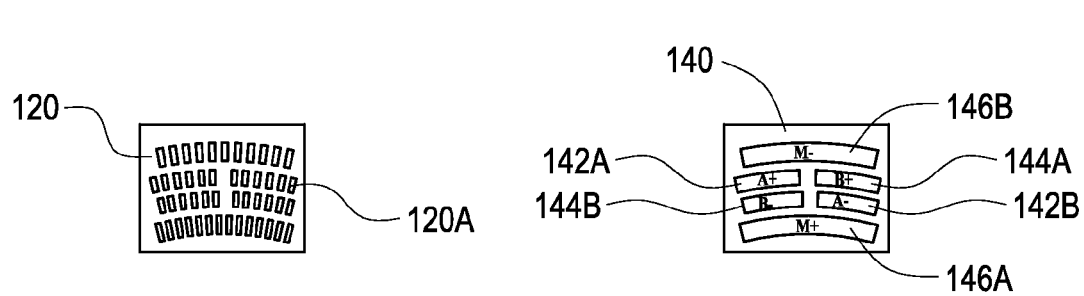
FIG.5B
FIG.5C

ABSOLUTE-TYPE ENCODER AND METHOD FOR DETECTING ABSOLUTE POSITION

BACKGROUND OF THE INVENTION

1. Field of the Invention

The present invention relates to an absolute-type encoder, especially to an absolute-type encoder exploiting the architecture of incremental-type encoder.

2. Description of Prior Art

The conventional AC servo motor generally comprises an optical encoder to sense angle information of a rotor; this angle information can be used to determine a stator driving current. Therefore, the speed of the AC servo motor can be precisely controlled FIG. 1 shows the schematic diagram of a prior art AC servo motor. The angular position of rotor in a motor 10 is detected by an optical encoder 12 and processed by a signal processing unit 20 to obtain angular information. The angular information is processed by a speed estimation unit 14 to obtain an estimated motor rotational speed. A speed controller 30 receives the estimated motor rotational speed and a speed command to control a controller module 32 and an IGBT module 34 in order to generate a motor speed control signal. The motor speed control signal can be used to precisely control the rotational speed of the motor 10.

More particularly, in the servo motor, the position sensor attached to the motor axis is the optical encoder 12. The position precision of the servo motor depends on the resolution of the optical encoder, where the optical encoder 12 can be classified to incremental-type encoder and absolute-type encoder.

The incremental-type encoder can provide information relative to previous position, and the absolute position of its encoder wheel cannot be known after power failure unless the position is reset. Therefore, the incremental-type encoder can not know the absolute position of its encoder wheel after power is just regained after power failure. On the contrary, the absolute-type encoder can always know the absolute position of the output axis without bothering by power failure. No reset operation is necessary after power on from power failure and the operation is simplified.

FIG. 2 shows the schematic view of an optical encoder. The light from a light source 260 reaches a light sensor 240 after passing a rotating wheel 200 and a fixed mask 220. The signal received by the light sensor 240 is varied according to the position change of the rotating wheel 200. Therefore, the position change of the rotating wheel 200 can be known by detecting the signal intensity of the light sensor 240.

FIG. 3 shows a schematic diagram of an absolute-type encoder wheel 300, which is a 6 bit encoder wheel. The absolute-type encoder wheel 300 comprises a round wheel body 302 and a plurality of gratings 304. The gratings 304 include a first grating 304A at innermost orbit and occupying ½ circumference, two second gratings 304B at second innermost orbit and each occupying ¼ circumference, third gratings 304C, fourth gratings 304D, fifth gratings 304E and 32 sixth grating 304F at outermost orbit and each occupying 1/64 circumference. Intensity-changing signal can be obtained along the radial direction and position resolution of $2^6=64$ can be achieved along circumference direction. However, one more orbit is needed when one bit resolution is to be enhanced in the absolute-type encoder wheel 300 shown in FIG. 3. The absolute-type encoder wheel 300 occupies more space when resolution is more demanding. The absolute-type encoder wheel 300 shown in FIG. 3 has limited resolution when its size is restricted.

FIG. 4A shows a schematic diagram of an encoder wheel 400 for an incremental-type optical encoder, which comprises a round wheel body 402 and a plurality of gratings. The gratings include main grating 404A, first sub grating 404B and second sub grating 404C, where the first sub grating 404B and the second sub grating 404C are arranged on two opposite sides of the main grating 404A. FIG. 4B shows the mask 420 associated with the encoder wheel 400, which comprises four rows of gratings 420A.

FIG. 4C shows the light sensor device 440 associated with the encoder wheel 400, which comprises main light sensor units 442A, 444A, 442B, 444B (labeled as A+/B+/A−/B−) corresponding to the main grating 404A. When the encoder wheel 400 rotates, the main light sensor units 442A, 444A, 442B, 444B (labeled as A+/B+/A−/B−) produces four sinusoid-like signals. The four sinusoid-like signals have phases of 0/90/180/270 degrees. The A+/A− signals with 180 degree phase difference are subjected to subtraction operation to obtain a sine signal A without common mode noise. The B+/B− signals with 180 degree phase difference are subjected to subtraction operation to obtain a cosine signal B without common mode noise. The sine signal A and cosine signal B with 90 degree phase difference can be used to judge forward or backward rotation.

The incremental-type optical encoder can obtain incremental position information based on the sine signal A and cosine signal B. To obtain absolute position information, origin light sensor unit 446A, 446B (Z+/Z−) are additionally provided. However, after power on from power failure, an origin mark on the incremental encoder should be sensed by the origin sensor unit to obtain the absolute position information. This process is time consuming and not suitable for application demanding no return to the origin mark.

SUMMARY OF THE INVENTION

It is the object of the present invention to provide an absolute-type encoder exploiting the architecture of incremental-type encoder, thus enhancing the resolution thereof.

Accordingly, the absolute-type encoder of the present invention includes an absolute-type encoder wheel. The absolute-type encoder wheel includes a primary optical grating unit and two secondary optical grating units, wherein the two secondary optical grating units are arranged outside and inside the primary optical grating unit and contain one less optical grating than that of the primary optical grating unit. The encoder wheel is rotated to find a zero point in the light detection signal of the secondary optical grating unit, and a corresponding light detection value of the primary optical grating unit is also determined. The absolute position of the encoder wheel can be calculated with reference to the corresponding light detection value. The absolute-type encoder can also be used as an incremental-type encoder to provide more versatility.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 5A shows the schematic view of an encoder wheel in the absolute-type optical encoder according to the present invention.

FIG. 5B shows the schematic diagram of the mask according to the present invention.

FIG. 5C shows the schematic diagram of the light sensor device.

DETAILED DESCRIPTION OF THE INVENTION

For prior art absolute-type optical encoder, physical coding, such as binary Code or Gray Code, is necessary to obtain the absolute position information. Moreover, the resolution of the absolute-type optical encoder also depends on the number of sensors. The size and cost of absolute-type optical encoder increase as the number of the sensor increases. In the present invention, the architecture of the incremental encoder is exploited to provide absolute position sensing function. Additional gratings are provided in the incremental encoder to generate modulating signals. Sine signal (or cosine signal) of 360 degree can be generated according to the modulating signals. The absolute position information can be obtained by interpolating the sine signal (or cosine signal).

FIG. 5A shows the schematic view of an encoder wheel 100 in the absolute-type optical encoder according to the present invention. The wheel 100 comprises a round wheel body 102 and a plurality of gratings. The gratings include a primary grating unit 104A with a plurality of main gratings located on a main track, and at least one secondary grating unit (there are two secondary grating units 104B and 104C shown in this figure) with a plurality of sub grating at least one modulating track. The grating number of the sub gratings is one less than that of the main grating. For example, the grating number of the sub gratings is 2499 when the grating number of the main gratings is 2500.

FIG. 5B shows the schematic diagram of the mask 120, which comprises four rows of grating 120A corresponding to light sensor device. FIG. 5C shows the schematic diagram of the light sensor device 140, which includes main light sensor units 142A, 144A, 142B, 144B (namely the areas marked with A+/B+/A−/B−) corresponding the location of the main gratings of the primary grating unit 104A. The light sensors device 140 further includes modulating light sensor units 146A and 146B (namely the areas marked with M+/M−) corresponding to the sub gratings of the secondary grating units 104B and 104C, respectively.

Figure 4A:
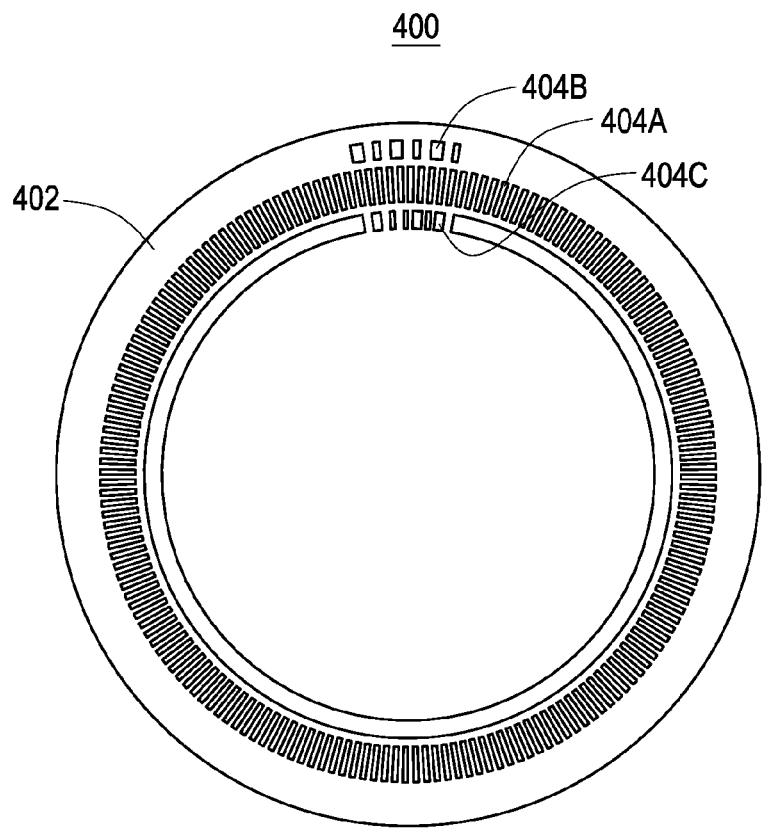
FIG. 4A shows a schematic diagram of an encoder wheel for an incremental-type optical encoder
Figure 4B:
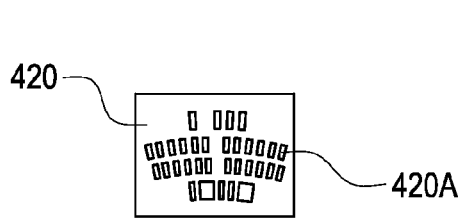
FIG. 4B shows the mask associated with the encoder wheel in FIG. 4A.
Figure 4C:
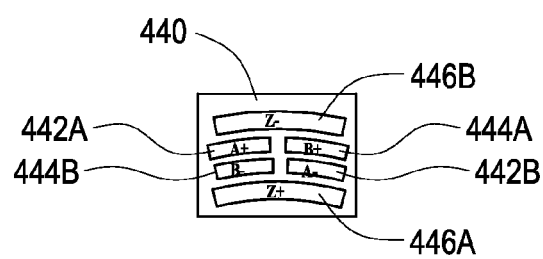
FIG. 4C shows the light sensor device associated with the encoder wheel in FIG. 4A.

In the present invention, the wheel in the incremental-type encoder, and associated components, are modified to provide absolute position information. With reference again to FIG. 5A, FIGS. 4A and 4C, the portions on wheel 100 corresponding to the Z+/Z− areas of the wheel 400 are provided with sub gratings each having one less graining than that of the main grating of the primary grating unit 104A. For easy of demonstration, the operation of the absolute-type encoder will be explained with sixteen main grating in primary grating unit 104A, fifteen sub gratings in secondary grating unit 104B and fifteen sub gratings in secondary grating units 104C.

Figure 1:
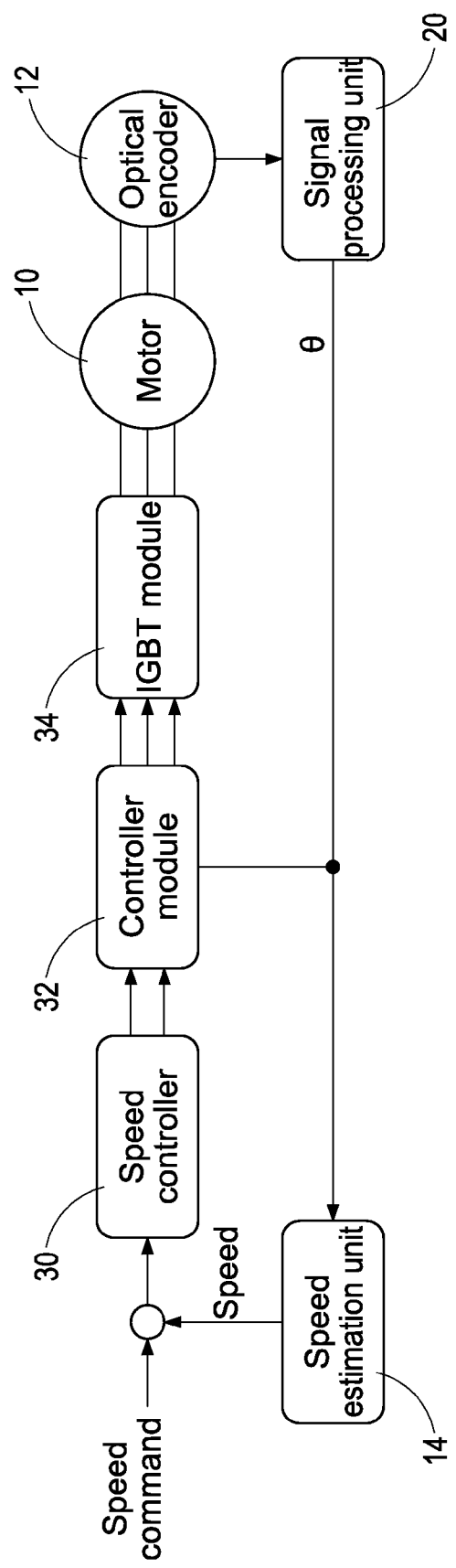
FIG. 1 shows the schematic diagram of a prior art AC servo motor.
Figure 2:
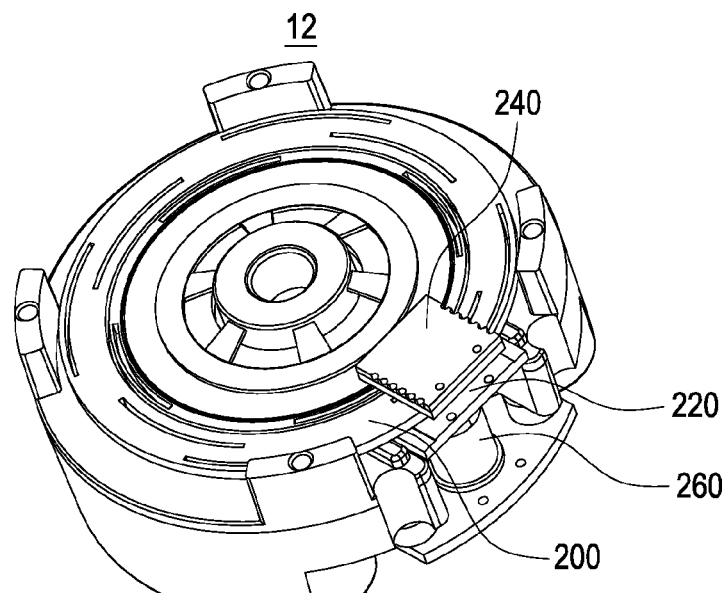
FIG. 2 shows the schematic view of an optical encoder.
Figure 3:
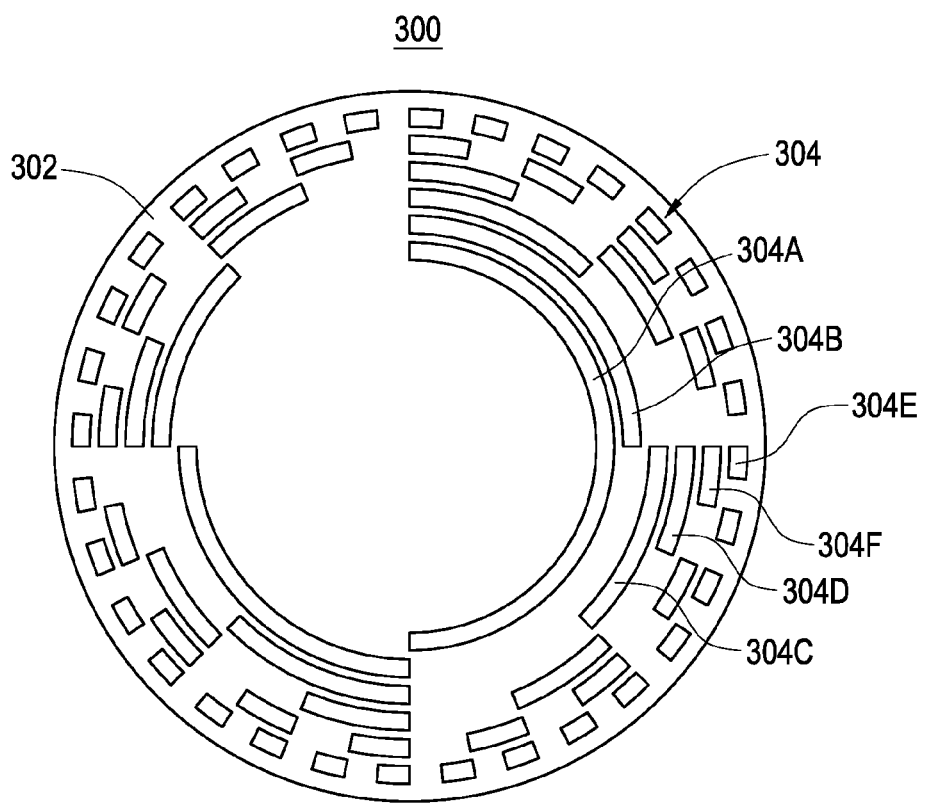
FIG. 3 shows a schematic diagram of an absolute-type encoder wheel.
Figure 6:
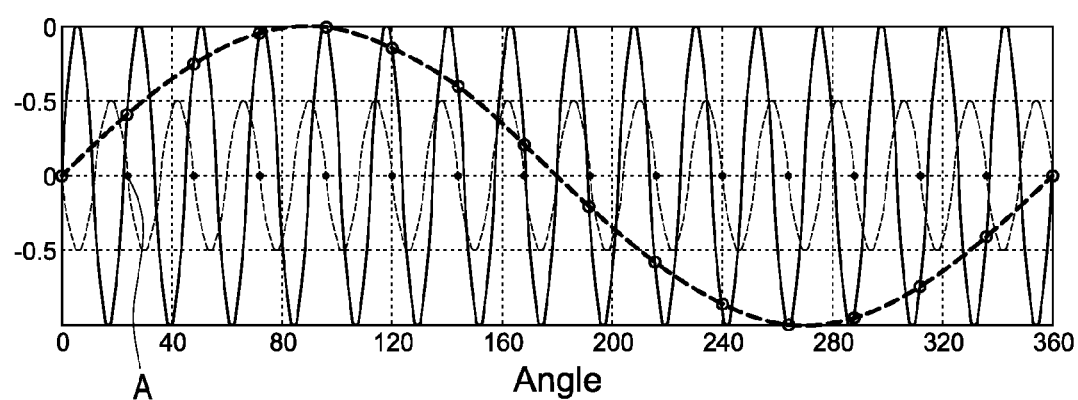
FIG. 6 shows the signal detected by the light sensor device

FIG. 6 shows the signal detected by the light sensor device 140. With one revolution of the wheel 100, the main light sensor units 142A and 142B (corresponding to the areas marked with A+/A−) generates first sine curve (solid line) of 16 period (each period has 360 degree phase) by differentiation. With one revolution of the wheel 100, the modulating light sensor unit 146A or 146B (corresponding to the areas marked with M+/M−) generates second sine curve (dashed line) of 15 period (each period has 360 degree phase). A third sine curve (bold dashed line) of one period (360 degree) can be obtained by sampling the first sine curve with zero points at the second sine curve, which will be detailed later. When power is again supplied to the absolute-type encoder of the present invention after power failure, a controller (not shown, could be the speed estimation unit 14 in FIG. 1) drives the wheel 100 to move a distance corresponding to one grating pitch of the sub gratings (namely 24 degree in this case with fifteen sub gratings). A 2 zero point A is found in the second sine curve sensed by the modulating light sensor unit 146A during the movement, and the first sine curve is sampled at the 2 zero point A. As can be seen from FIG. 6, the third sine curve generated by sampling is sine curve (bold dashed line) of one period (360 degree). The absolute position of the encoder can be known from the value of the third sine curve designated by the 2 zero point A.

The absolute position of the encoder has resolution of 24 degree based on the example of sixteen main grating and fifteen sub gratings. The resolution can be enhanced with more main grating 104A, for example, 2500.

Similarly, the cosine curve generated by the main light sensor units 144A and 144B (corresponding to the areas marked with B+/B−) can also be sampled by 2 zero point in the sensed result of the modulating light sensor unit 146A (or 146B). The absolute position of the encoder can be known from the value of the sampled result. In the present invention, the absolute position of the encoder is obtained with the help of gratings having resolution similar to those of incremental encoder. Therefore, the resolution of absolute position is enhanced. Moreover, the resolution can be further enhanced by interpolation if the high order harmonic components in original sine and cosine curves are sufficiently small.

The advantages of the present invention can be summarized as follows.

1. Absolute position information is available by incremental encoder-like architecture.

2. The position resolution can be enhanced by interpolating the incremental position signal.

3. The signals from the main light sensor units and the modulating light sensor unit are differentially amplified to remove common mode noise.

Moreover, the absolute-type encoder of the present invention is demonstrated in terms of optical encoder. It should be noted that the scheme of the present invention can be applied to other kinds of encoder or angle resolver based on electromagnetic or capacitive signals.

What is claimed is:

1. An absolute-type optical encoder for judging an absolute position of a wheel body with respect to a light source, comprising:

a primary grating unit having main gratings of first number and the main gratings arranged around a circumference of the wheel body;

at least one secondary optical grating unit having sub gratings of second number, the sub gratings arranged around another circumference of the wheel body, wherein the second number is one less than the first number;

a plurality of main light sensor units arranged corresponding to the primary grating unit and receiving light from the light source passing through the primary grating unit to obtain a first sensed result;

at least one modulation light sensor unit corresponding to the at least one secondary optical grating unit and receiving light from the light source passing through the secondary grating unit to obtain a second sensed result;

a controller electrically connected to the main light sensor units and the modulation light sensor unit, the controller configured with one revolution of the wheel body by means of continuously driving the wheel body to rotate a distance corresponding to a grating pitch of the sub gratings, finding a zero point in the second sensed result, and finding a sampled value of a first sensed result with reference to the zero point to obtain the absolute position of the wheel body based on the sampled values.

2. The absolute-type optical encoder in claim 1, wherein the absolute-type encoder comprises one secondary optical grating unit and the secondary optical grating unit is located inside the primary grating unit.

3. The absolute-type optical encoder in claim 1, wherein the absolute-type encoder comprises one secondary optical grating unit and the secondary optical grating unit is located outside the primary grating unit.

4. The absolute-type optical encoder in claim 1, wherein the absolute-type encoder comprises two secondary optical grating units and the secondary optical grating units are located inside and outside the primary grating unit, respectively.

5. The absolute-type optical encoder in claim 1, wherein the main light sensor units comprises four sensor units with signal phase difference of 90 degrees.

6. The absolute-type optical encoder in claim 1, wherein the modulation light sensor units comprises two light sensor units with signal phase difference of 180 degrees.

7. A method for sensing an absolute position of an optical encoder wheel, comprising:
providing a light source;
providing an absolute-type encoder wheel, which comprises a wheel body; a primary grating unit having main gratings of first number and the main gratings arranged around a circumference of the wheel body; and at least one secondary optical grating unit having sub gratings of second number, the sub gratings arranged around another circumference of the wheel body, wherein the second number is one less than the first number;

providing a plurality of main light sensor units arranged corresponding to the primary grating unit and receiving light from the light source passing through the primary grating unit to obtain a first sensed result;

providing at least one modulation light sensor unit corresponding to the at least one secondary optical grating unit and receiving light from the light source passing through the secondary grating unit to obtain a second sensed result;

with one revolution of the wheel body, continuously driving the wheel body to rotate a distance corresponding to a grating pitch of the sub gratings and finding a zero point in the second sensed result; and finding sampled values of the first sensed result with reference to the zero points, and obtaining the absolute position of the encoder wheel based on the sampled values.

8. The method in claim 7 wherein the first number is N and the second number is (N−1), with one revolution of the wheel body the first sensed result is a sine curve of N periods each having 360 degree phase and the second sensed result is a sine curves of (N−1) periods each having 360 degree phase by differentiation, the grating pitch is 360 degrees divided by (N−1), and all the sampled values at all zero points is a sine curve of 360 degrees.

9. The method in claim 7, wherein the first number is N and the second number is (N−1), with one revolution of the wheel body the first sensed result is a cosine curve of N periods each having 360 degree phase and the second sensed result is a cosine curves of (N−1) periods each having 360 degree phase by differentiation, the grating pitch is 360 degrees divided by (N−1), and all the sampled values at all zero points is a cosine curve of 360 degrees.

* * * * *